April 8, 1958 M. B. STOKES 2,829,462
FISHING LURES
Filed Sept. 26, 1955
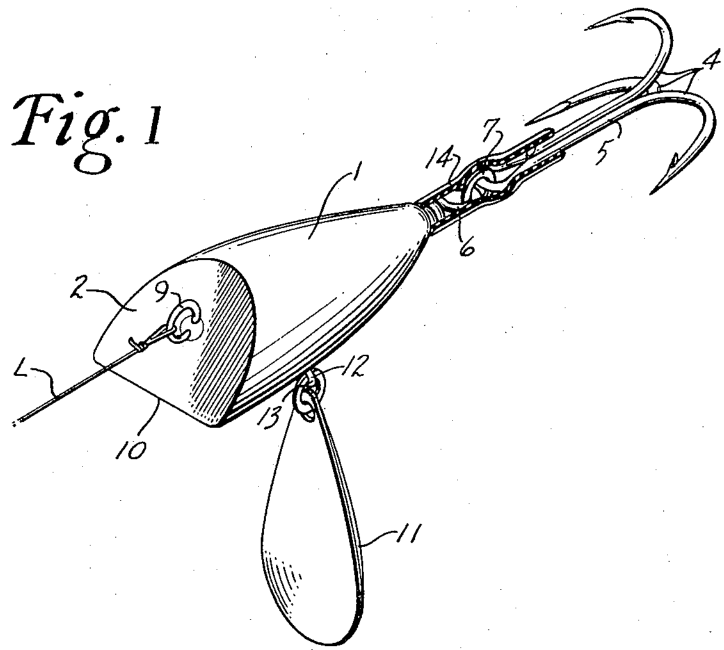
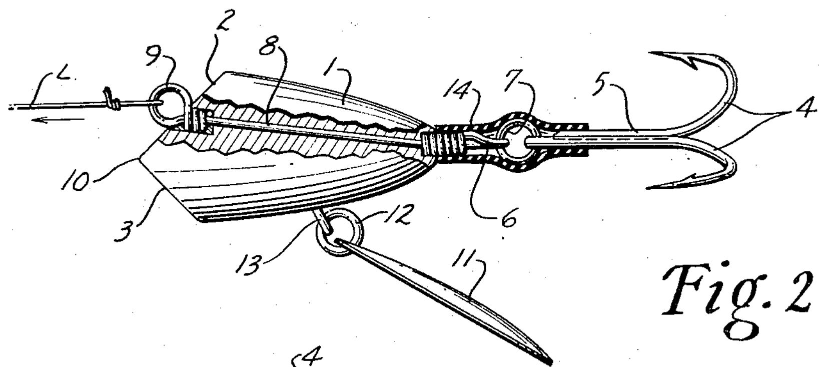
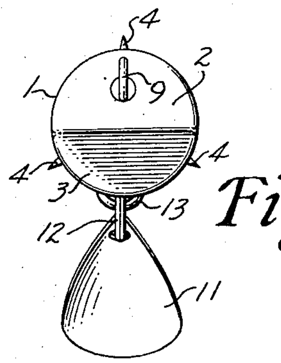
INVENTOR.
MEREDITH B. STOKES
BY
Reynolds, Beach & Christensen
ATTORNEYS United States Patent Office 2,829,462

Patented Apr. 8, 1958

2,829,462

FISHING LURES

Meredith B. Stokes, Edmonds, Wash.

Application September 26, 1955, Serial No. 536,494

2 Claims. (Cl. 43—42.48)

The present invention relates to a fishing lure and more particularly a fishing lure which is a combination of a plug body and spoon depending from the body.

An object is to provide a lure which will be very active in the water and will dart from side to side and up and down sporadically so as to simulate the movement of a bait fish or even an injured bait fish.

In addition to controlling movement of the lure it is an object to provide a lure which can be seen readily by fish and the parts of which will have relative movement further to attract a fish.

It is another object to support a fish hook relative to the body of the lure in a position which will insure that the hook will be engulfed by the mouth of a fish striking at the lure despite the erratic path through which the lure moves and the relative movement of parts of the lure.

In general the lure includes a plug body tapered rearwardly and having a wedge-shaped front end including an upper standing bevel and a lower under bevel. Forward connecting means for a fishing line preferably project from the standing bevel portion of the forward end and a fish hook is connected to the rearward end of the plug body. Preferably connecting means for the fish hook carried by the rearward portion of the body project rearwardly, and such connecting means and the hook shank are embraced by a piece of flexible resilient tubing to maintain the hook shank extending lengthwise of the lure body. A pendant spoon is swingably attached to the bottom of the plug body about midway between its ends and having its concave surface facing forward. A lure having portions of the preferred shape and arrangement is shown in the drawings.

Figure 1 is a top perspective view of the lure with parts broken away.

Figure 2 is a side elevation of the lure having parts broken away.

Figure 3 is a front elevation of the lure.

In fishing lures it has been found that the movement of the lure and its attractiveness are more important than the particular shape of the lure because apparently fish are not particularly discriminating as to the shape of a lure. The present lure, therefore, has been constructed so as to duplicate as far as possible the type of movement characteristic of a bait fish and to attract fish to it without any particular concern to providing the lure with an appearance resembling that of a bait fish.

The lure includes a buoyant plug body 1 which preferably is made of durable wood such as Alaska cedar. To attract fish this body may be painted or otherwise brilliantly colored, such as being of orange color, and may even be coated with a fluorescent coating to enable it to be visible at a greater distance. The body is shaped to afford the type of lure movement desired and is tapered rearwardly over the major portion of its length. It is preferred that the lure be of circular cross section in planes transversely of its length. The taper need not be precisely uniform, but as shown may provide a body having a longitudinally convex curvature. The taper need not proceed to a point but the trailing end of the plug body can be rounded as shown best in Figure 2.

The shape of the front end of the body is much more important in controlling the body movement. As shown in Figures 2 and 3 the front end of the body is of wedge shape, including an upper standing bevel 2 and a lower under bevel 3. The angle between these bevels is approximtely ninety degrees, and it is preferred that they be disposed at about the same angle to a longitudinal, horizontal plane through the body, namely about forty-five degrees. Since a wooden body tends to float, however, the upper bevel 2 may be somewhat longer than the under bevel lengthwise of the lure body. The complete lure, when stationary, will sink.

The fish hook 4, which may be of the multiple-hook type, projects rearwardly from the rearward end of the body. Its shank 5 may be connected to an eye 6 projecting rearwardly from the central portion of the rearward end of the plug body by a split connecting ring 7. A strong connection between the hook-securing eye 6 and the pulling line L is effected by extending longitudinally through the lure body 1 the shank 8 of the wire from which the hook attaching eye 6 is formed. The forward end of this wire may be formed as an eye 9, at least partially projecting from the front end of the plug body, so that the line L can be attached to it easily.

The weight of the hook 4 tends to sink the trailing portion of the plug body, and because of its rearward taper the trailing portion of the body has less buoyancy than the forward portion. Consequently, the trailing portion of the body tends to sink and this tendency is counteracted by making the surface of the standing bevel 2 larger than the surface of the under bevel 3 as described above, and placing the lure towing eye 9 above the corner 10 at which the bevels 2 and 3 intersect. Preferably the eye 9 is located approximately midway between the fore and aft extremities of the standing bevel 2. By thus offsetting the line of pull somewhat above the axis of the plug body the pulling force and the plug body resistance produce a force couple tending to depress the front end of the plug and elevate its rearward end, thus opposing the action of the hook weight and the buoyancy of the plug body.

It has been found that the plug body may be given an erratic darting movement both up and down and sideways as it is drawn through the water by the line L by providing a swingably mounted pendant spoon 11 suspended from the bottom of the lure with its concave surface facing forward. Such spoon may be supported for swinging by a ring 12 which is attached to an eye 13 secured in the plug bottom approximately midway between its fore and aft ends, although best results have been obtained by mounting such eye slightly rearwardly of the center of the plug body in a fore and aft direction. The spoon is of conventional shape tapering toward the end by which it is suspended and should be of a length approximately equal to the length of the plug body, although it may be somewhat shorter as shown in the drawings.

When the fishing lure is not being pulled through the water, the spoon 11 will hang vertically downward from the eye 13 as shown in Figure 1. As the lure is towed through the water as indicated by the arrow in Figure 2, however, the resistance of the water will swing the lower end of spoon 11 rearwardly as indicated in Figure 2, and the degree of spoon inclination will depnd on the speed with which the lure is drawn through the water. While during such movement the forwardly facing convex side of the spoon 11 will tend to catch the water, any slight tipping of the spoon will cause it to be deflected swingably to one side or the other and to spill the water. Such movement of the spoon will cause the plug body to dart in one direction, which change of direction will unbalance the forces on the spoon so that it will tend to swing in the opposite direction.

As soon as movement of the spoon about its supported end is reversed, other forces are produced on the plug body 1, and the precise direction and duration of such forces in each instance cannot be predicted but will depend upon the speed of movement of the lure through the water, the size of the spoon 11, the size of the plug body, and the shape of the spoon and of the plug body. Also the movement of the lure will depend upon the location of the towing eye 9. It has been found that the combination of these various factors will cause the lure to dart first in one direction and then in another, both laterally and up and down, at different speeds and times, and for different distances, thus very closely simulating swimming movements of a fish or of an injured fish.

Not only does the movement of the lure as a whole simulate the manner in which a fish swims, but the swinging of spoon 11 relative to the plug body reasonably simulates the movement of the tail and fins of a fish relative to its body. The entire combination of movements executed by the lure and its parts, therefore, is sufficiently similar to the swimming of a fish as to constitute a very effective bait.

When the lure is being drawn slowly through the water, the hook 4 would droop downward relative to its supporting eye 6, and the hook would probably not trail directly behind the plug body even at considerably faster speeds. It is preferred, however, to have the hook extend straight behind the plug body, although it is undesirable to have the hook connected rigidly to the body. By maintaining the hook in the attitude shown in Figures 1 and 2 it is virtually certain to be engulfed by the mouth of a fish striking the lure from behind as occurs most frequently.

The hook locating device shown in Figures 1 and 2 includes the eye 6 projecting a substantial distance rearwardly from the plug body 1. A supporting sleeve 14 embraces this projecting eye, the shank 5 of hook 4, and the interconnecting ring 7. Such sleeve is of resilient character and may, for example, be made of surgical tubing. The length of such sleeve preferably is slightly less than the length of the hook shank.

The procedure for attaching the hook includes first slipping the sleeve over the hook shank far enough so that its eye is exposed sufficiently to enable the split ring 7 to be passed through it. Next the split ring is engaged with the eye 6 projecting rearwardly from the plug body 1. Finally the sleeve 14 is pulled forwardly over the connecting ring 7 and the eye 6 until its forward end is located adjacent to the aft end of the plug body. In this position the rearward end of the sleeve will still extend sufficiently far along the hook shank 5 so as to maintain the hook shank in longitudinally trailing position as shown in Figures 1 and 2. By reverse procedure the hook can be disconnected from the plug body at any time for replacement by another hook.

When a hook is mounted in the manner described, it is evident that its position relative to the plug body 1 will be maintained substantially constant irrespective of the abruptness with which the plug body changes its direction of movement.

In action it has been found that despite the active and unpredictable darting action of the lure the spoon 11 serves as a stabilizing member which prevents the plug body 1 from rotating about its axis. The under bevel surface 3 cooperating with the upper bevel surface 2 stabilizes the movement of the lure so that the downward pull of the line and the drag of the spoon does not flip the lure end over end. Consequently, lures of this type have proven to be very effective for catching fish.

I claim as my invention:

1. A fishing lure comprising a plug body of circular cross section tapered rearwardly and having a wedge-shaped forward end including an upper standing bevel and a lower under bevel of a length lengthwise of said body less than the length of said upper standing bevel, forward connecting means carried by the forward end of said body generally centrally of said standing bevel for connecting a pulling line thereto, rearward connecting means carried by the aft portion of said body and projecting rearwardly therefrom, a fish hook disposed behind said body and having a shank, flexible joining means interconnecting said hook shank and said rearward connecting means enabling said hook to swing relative to said body, a resilient sleeve snugly embracing said rearward connecting means, said flexible joining means and said hook shank and operable to maintain said hook shank normally extending lengthwise of said body, bottom connecting means carried by the bottom of said body generally centrally thereof, a pendant concave fishing spoon beneath said body disposed with its concave surface facing forwardly, and flexible means interconnecting said bottom connecting means and said pendant fishing spoon and supporting said spoon from said bottom connecting means for swinging of the lower end of said spoon transversely of and relative to said body.

2. A fishing lure comprising a plug body tapered rearwardly and having a wedge-shaped forward end including an upper standing bevel and a lower under bevel of a length lengthwise of said body less than the length of said upper standing bevel, forward connecting means carried by the forward end of said body generally centrally of said standing bevel for connecting a pulling line thereto, rearward connecting means carried by the aft portion of said body and projecting rearwardly therefrom, a fish hook carried by said rearward connecting means, bottom connecting means carried by the bottom of said body generally centrally thereof fore and aft, a pendant plate member beneath said body, and swingable means interconnecting said bottom connecting means and said pendant plate member and supporting said pendant plate member from said bottom connecting means disposed generally in a plane extending transversely of said plug body but swingable fore and aft generally about its upper edge.

References Cited in the file of this patent

UNITED STATES PATENTS

| | | |
|---|---|---|
| 1,086,256 | Wilber et al. | Feb. 3, 1914 |
| 1,239,956 | Phiney | Sept. 11, 1917 |
| 1,870,767 | Brown | Aug. 9, 1932 |
| 2,435,730 | Warden | Feb. 10, 1948 |
| 2,538,484 | Tenn | Jan. 16, 1951 |